(12) United States Patent
Rogers (10) Patent No.: US 12,510,208 B2
(45) Date of Patent: Dec. 30, 2025

(54) ATTACHMENT SYSTEM HAVING ANCHORING DEVICE ENGAGEABLE WITH A SLOTTED BASE

(71) Applicant: LaunchPad Industries, LLC, Midland, MI (US)

(72) Inventor: Grant Rogers, Midland, MI (US)

(73) Assignee: LaunchPad Industries LLC, Midland, MI (US)

( * ) Notice: Subject to any disclaimer, the term of this patent is extended or adjusted under 35 U.S.C. 154(b) by 25 days.

(21) Appl. No.: 18/412,669

(22) Filed: Jan. 15, 2024

(65) Prior Publication Data

US 2024/0280215 A1 Aug. 22, 2024

Related U.S. Application Data

(60) Provisional application No. 63/485,282, filed on Feb. 16, 2023.

(51) Int. Cl.
*F16M 13/02* (2006.01)

(52) U.S. Cl.
CPC ................ *F16M 13/022* (2013.01)

(58) Field of Classification Search
CPC ...... F16M 13/022; F16M 11/041; B25H 3/04; H05K 5/00
See application file for complete search history.

(56) References Cited

U.S. PATENT DOCUMENTS

| | | |
|---|---|---|
| 2,688,504 A | 9/1954 | Parker |
| 2,736,272 A * | 2/1956 | Elsner ............... A47B 91/08 |
| | | 24/265 R |
| 3,282,229 A | 11/1966 | Elsner |
| 3,523,669 A | 8/1970 | Avallone |
| 3,677,195 A | 7/1972 | Prete, Jr. |
| 4,256,424 A | 3/1981 | Knox et al. |
| 4,376,522 A | 3/1983 | Banks |
| 4,396,175 A | 8/1983 | Long et al. |
| 4,530,493 A * | 7/1985 | Break ............... B25B 5/10 |
| | | 269/93 |
| 4,796,837 A | 1/1989 | Dowd |
| 4,932,816 A | 6/1990 | Ligensa |
| 5,871,318 A | 2/1999 | Dixon et al. |
| 7,785,053 B2 | 8/2010 | Hudson |
| 7,975,979 B2 | 7/2011 | Bishop |

(Continued)

FOREIGN PATENT DOCUMENTS

| | | |
|---|---|---|
| EP | 2206623 A1 | 7/2010 |
| WO | 2005028306 A1 | 3/2005 |

*Primary Examiner* — Monica E Millner (74) *Attorney, Agent, or Firm* — Carlson, Gaskey & Olds, P.C.

(57) ABSTRACT

An attachment system includes a lock of an anchoring device and a latch assembly of the anchoring device. The latch assembly is configured to shift relative to the lock along a latch axis from a first axial position to second axial position as the lock is blocked from shifting by a slotted base. When the latch assembly is in the first axial position, the latch assembly is blocked from rotating from a disengaged position with the slotted base to an engaged position with the slotted base. When the latch assembly is in the second axial position, the latch assembly is rotatable between the engaged position with the slotted base and the disengaged position with the slotted base.

24 Claims, 8 Drawing Sheets

(56) References Cited

U.S. PATENT DOCUMENTS

| | | | | |
|---|---|---|---|---|
| 8,408,853 B2 * | 4/2013 | Womack | ............... | B60P 7/0815 |
| | | | | 410/104 |
| 8,657,545 B2 * | 2/2014 | Magno, Jr. | .............. | F16B 7/187 |
| | | | | 248/316.1 |
| 9,022,708 B2 * | 5/2015 | Frey | ................... | B64D 11/0696 |
| | | | | 410/105 |
| 9,296,482 B2 * | 3/2016 | Jones | .................... | B60P 7/0815 |
| 9,944,217 B2 | 4/2018 | Schroeder et al. | | |
| 10,144,335 B2 | 12/2018 | Gomes et al. | | |
| 10,900,607 B1 * | 1/2021 | Newman | ................... | F16B 7/00 |
| 11,059,591 B2 | 7/2021 | Guillet et al. | | |
| 11,079,064 B1 * | 8/2021 | Cifers | .................... | A01K 97/10 |
| 11,867,353 B1 * | 1/2024 | Cifers | ...................... | F16B 7/04 |
| 2007/0063122 A1 * | 3/2007 | Bowd | ....................... | B64C 1/20 |
| | | | | 248/429 |
| 2013/0094920 A1 * | 4/2013 | Massicotte | ........... | B60P 7/0807 |
| | | | | 410/82 |
| 2016/0016668 A1 | 1/2016 | Danet | | |
| 2016/0039526 A1 | 2/2016 | Mejuhas | | |
| 2016/0251082 A1 | 9/2016 | Shih et al. | | |

\* cited by examiner

ATTACHMENT SYSTEM HAVING ANCHORING DEVICE ENGAGEABLE WITH A SLOTTED BASE

CROSS-REFERENCE TO RELATED APPLICATION

This application claims priority to U.S. Provisional Application No. 63/485,282, which was filed on 16 Feb. 2023 and is incorporated herein by reference in its entirety.

BACKGROUND

Attachment systems can be used to secure items. Attachment systems can be utilized in residences, garages, workbenches, aircraft, businesses, vehicles, and in other environments. Some attachment systems can secure items to a slotted base at a plurality of different locations.

SUMMARY

In some aspects, the techniques described herein relate to an attachment system, including: a lock of an anchoring device; and a latch assembly of the anchoring device, the latch assembly configured to shift relative to the lock along a latch axis from a first axial position to second axial position as the lock is blocked from shifting by a slotted base, when the latch assembly is in the first axial position, the latch assembly is blocked from rotating from a disengaged position with the slotted base to an engaged position with the slotted base, when the latch assembly is in the second axial position, the latch assembly is rotatable between the engaged position with the slotted base and the disengaged position with the slotted base.

In some aspects, the techniques described herein relate to an attachment system, wherein the lock is a lock collar having a bore that receives the latch assembly.

In some aspects, the techniques described herein relate to an attachment system, further including an outer housing of the anchoring device, the lock collar at least partially received within the outer housing, the lock collar extending further from the outer housing along the latch axis when the latch assembly is in the first axial position than when the latch assembly is in the second axial position.

In some aspects, the techniques described herein relate to an attachment system, further including at least one finger of the lock collar the at least one finger protruding from the outer housing along the latch axis when the latch assembly is in the first axial position, the at least one finger configured to directly contact an outer surface of the slotted base.

In some aspects, the techniques described herein relate to an attachment system, further including a spring of the anchoring device, the spring sandwiched along the latch axis between the outer housing and the lock collar, the spring biasing the lock collar away from the outer housing along the latch axis.

In some aspects, the techniques described herein relate to an attachment system, further including a rotation control system of the anchoring device, the rotation control system having a lock pin received within a first area of a slot when the lock is in the first axial position, the lock pin received within a second area of the slot when the lock is in the second axial position, the first area axially offset from the second area, the first area permitting rotation of the latch assembly to the engaged position, the second area preventing rotation of the latch assembly to the engaged position.

In some aspects, the techniques described herein relate to an attachment system, wherein the lock is a lock collar having a bore that receives the latch assembly, wherein the latch assembly includes the lock pin that extends radially from the latch axis into the slot within the lock collar.

In some aspects, the techniques described herein relate to an attachment system, wherein the latch assembly further includes a handle configured to be utilized to shift the latch assembly relative to the lock along the latch axis from the first axial position to the second axial position as the lock is blocked from shifting by a slotted base, and further configured to be utilized to rotate the latch assembly from the disengaged position to the engaged position.

In some aspects, the techniques described herein relate to an attachment system, further including a latch alignment base of the anchoring device, the latch alignment base received within a channel that is provided by the slotted base when the latch assembly is shifted along the latch axis from the first axial position to the second axial position.

In some aspects, the techniques described herein relate to an attachment system, wherein the latch alignment base has a profile, the slotted base including a plurality of channel areas each having the profile such that the latch assembly is engageable with the slotted base at a plurality of different engagement positions.

In some aspects, the techniques described herein relate to an attachment system, wherein at least some of the plurality of different engagement positions are disposed along a base axis, wherein, when the latch assembly is in the engaged position, the latch alignment base contacts the slotted base to block movement of the latch assembly relative to the slotted base along the base axis, and the latch assembly blocks withdrawal of the anchoring device from the slotted base.

In some aspects, the techniques described herein relate to an attachment system, wherein the latch assembly includes at least one latch foot that contacts an underside of the slotted base to block withdrawn of the latch alignment base from the slotted base when the latch assembly is in the engaged position.

In some aspects, the techniques described herein relate to an attachment system, wherein the latch assembly is biased toward the engaged position.

In some aspects, the techniques described herein relate to an attachment method, including: as a latch assembly and a latch alignment base of an attachment system are inserted into a channel of an slotted base, shifting the latch assembly and the latch alignment base relative to a lock along a latch axis from a first axial position to a second axial position; blocking the latch assembly from rotating from a disengaged position with the slotted base to an engaged position with the slotted base when the latch assembly and the latch alignment base are in the first axial position; and permitting the latch assembly to rotate about the latch axis from the disengaged position with the slotted base to the engaged position with the slotted base when the latch assembly and the latch alignment base are in the second axial position.

In some aspects, the techniques described herein relate to an attachment method, further including biasing the latch assembly toward the engaged position.

In some aspects, the techniques described herein relate to an attachment method, further including actuating a handle of the latch assembly to overcome the biasing and to transition the latch assembly away from the engaged position.

In some aspects, the techniques described herein relate to an attachment method, further including preventing rotation of the latch assembly to the engaged position by limiting movement of a lock pin of a rotation control system, the lock pin received within a first area of a slot when the lock is in the first axial position, the lock pin received within a second area of the slot when the lock is in the second axial position, the first area axially offset from the second area, the first area permitting rotation of latch to the engaged position, the second area preventing rotation of the latch to the engaged position.

In some aspects, the techniques described herein relate to an attachment method, further including providing the slot within the lock.

In some aspects, the techniques described herein relate to an attachment method, wherein the latch alignment base has a profile, the slotted base including a plurality of channel areas each having the profile such that the latch assembly is engageable with the slotted base at a plurality of different engagement positions.

In some aspects, the techniques described herein relate to an attachment method, further including supporting an item relative to the slotted base through the attachment system.

DETAILED DESCRIPTION

An attachment system includes an anchoring device that include a latch assembly. In some examples, the anchoring device can selectively engage a slotted base, which is secured directly to a structure, such as a garage wall, a boat deck, a vehicle, a workbench, etc. The anchoring device can include bores that receive a threaded fastener to secure an item to the anchoring device. When the anchoring device is engaged with the slotted base, the item secured to the anchoring device is secured to the slotted base.

Figure 1:
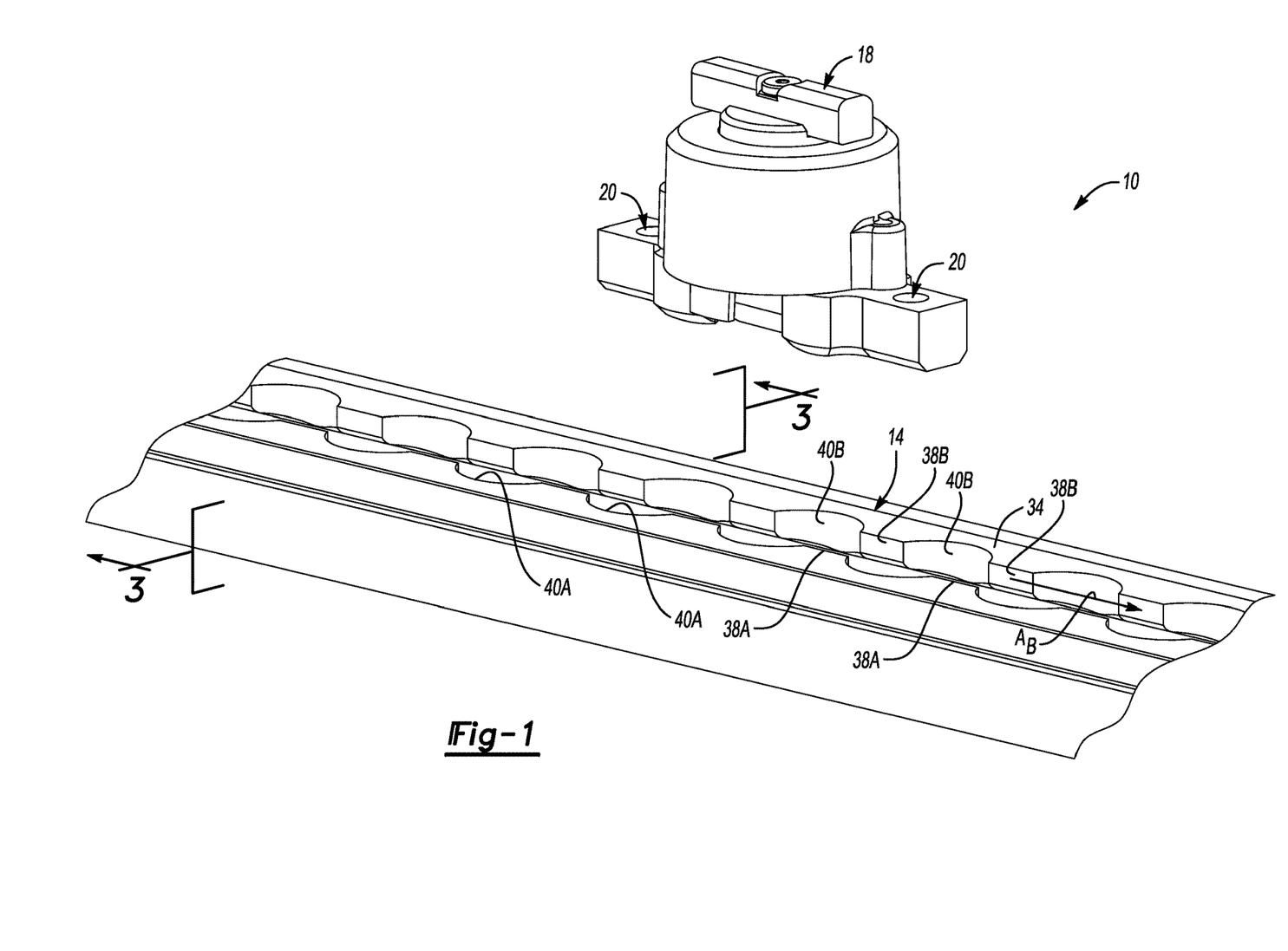
FIG. 1 illustrates an attachment system having an anchoring device that can selectively engage a slotted base according to an exemplary aspect of the present disclosure.
Figure 2:
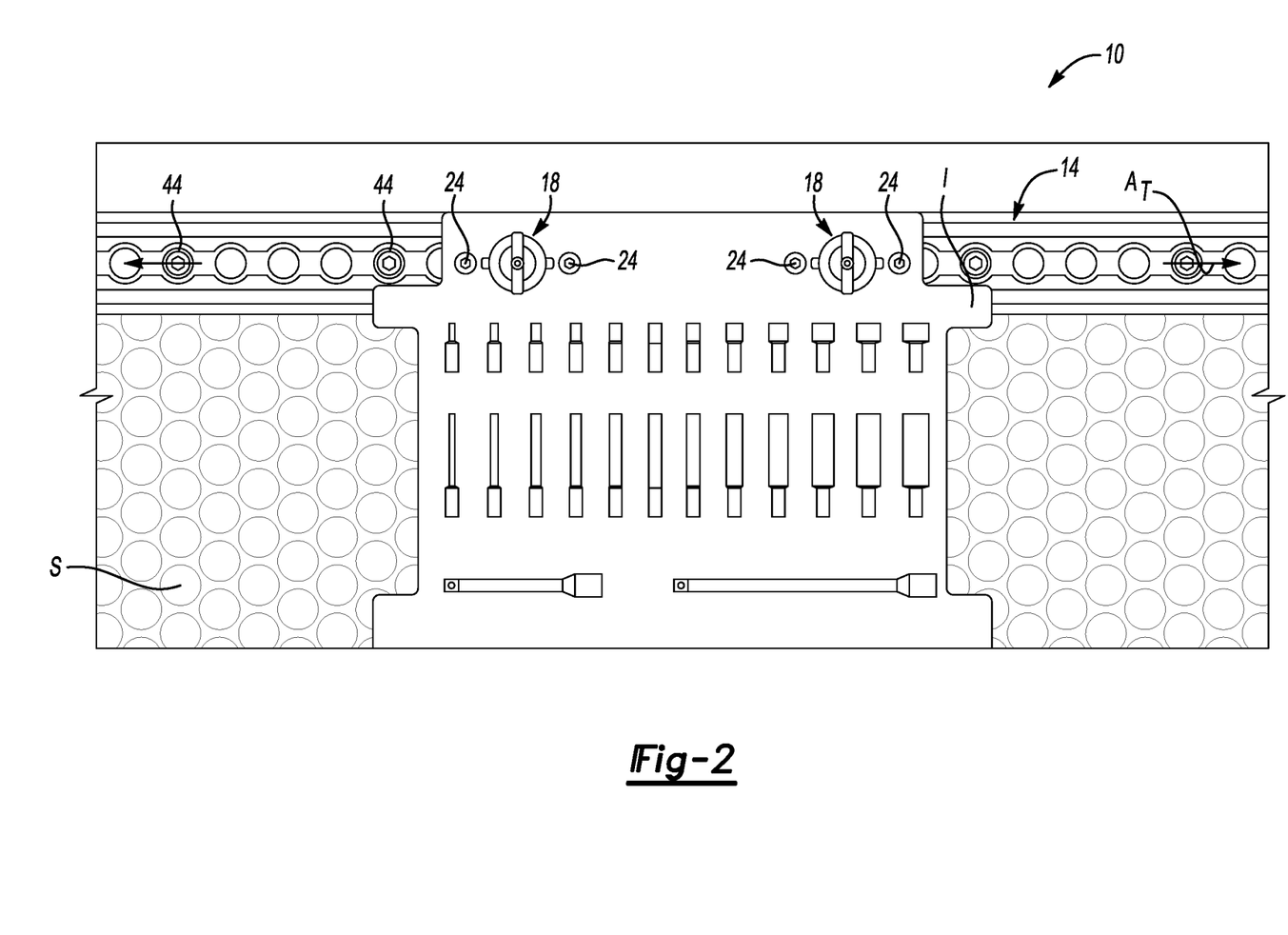
FIG. 2 illustrates the attachment system of FIG. 1 supporting an item—here a socket set.
Figure 3:
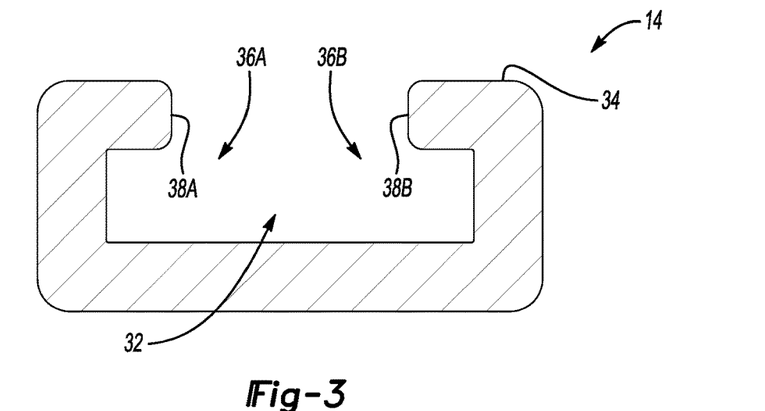
FIG. 3 illustrates a section view of the slotted base taken at line 3-3 in FIG. 1.

With reference to FIGS. 1 to 3, an attachment system 10, according to an exemplary aspect of the present disclosure, includes a slotted base 14 and an anchoring device 18. The anchoring device 18 is selectively receivable with the slotted base 14 at a plurality of different positions along a base axis $A_B$. That is, the slotted base 14 can receive the anchoring device 18 at a plurality of different positions along the base axis $A_B$.

An item I, here a socket set, can be secured to the slotted base 14 through the anchoring device 18. In this example, the anchoring device 18 includes a pair of threaded bores 20. The item I can be secured to the anchoring device 18 using mechanical fasteners 24 received in the threaded bores 30. This attaches the item I to the anchoring device 18. If the item I is attached to the anchoring device 18, the item I is secured to the slotted base 14 when the anchoring device 18 is engaged with the slotted base 14. In another example, the anchoring device 18 could clamp the item I.

The example slotted base 14 is a slotted track that includes a channel 32 extending longitudinally along a base axis $A_B$. The channel 32 opens to an outer surface 34 of the slotted base 14. At the outer surface 34, a profile of the channel 32 on a first side 36A mirrors a profile of the channel 32 on a second side 36B.

On the first side 36A of the channel 32, a plurality of first fingers 38A overhang a lower area of the channel 32 and alternate with a plurality of first arc-shaped cutouts 40A along the axis $A_B$. On the second side 36B of the channel 32, a plurality of second fingers 38B overhang the lower area of the channel 32 and alternate with a plurality of second arc-shaped cutouts 40B along the axis $A_B$. The first fingers 38A and the second fingers 38B are aligned along the base axis $A_B$, as are the first arc-shaped cutouts 40A and the second arc-shaped cutouts 40B. The first fingers 38A and the second fingers 38B protrude more than the first arc-shaped cutouts 40A and the second arc-shaped cutouts 40B. The opening to the channel 32 is narrower between the first fingers 38A and the second fingers 38B than between the first arc-shaped cutouts 40A and the second arc-shaped cutouts 40B.

The slotted base 14 can be anchored to a structure S, such as a workbench or garage wall, with mechanical fasteners 44. The slotted base 14 could be fastened to the structure S in other ways, such as with welds, for example.

The slotted base 14 can be an extruded structure. The first arc-shaped cutouts 40A and the second arc-shaped cutouts 40B that provide wider areas of the channel 32 can be machined into the extruded structure.

Figure 4:
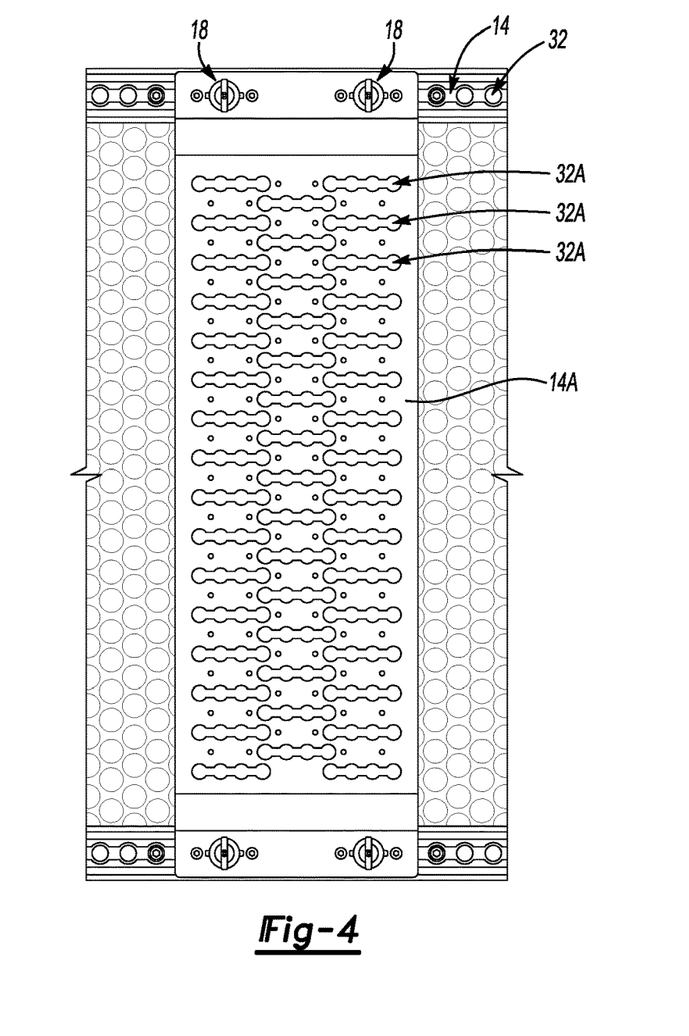
FIG. 4 illustrates the slotted base of FIG. 1, which has one channel, supporting another slotted base, which has more than one channel.

The example slotted base 14 includes the channel 32 and no other channels. In other examples, such as the example of FIG. 4, a slotted base 14A could include more than one channel 32A. As shown, the slotted base 14A can attach to the slotted base 14 using the anchoring device 18.

Figures 5, 6:
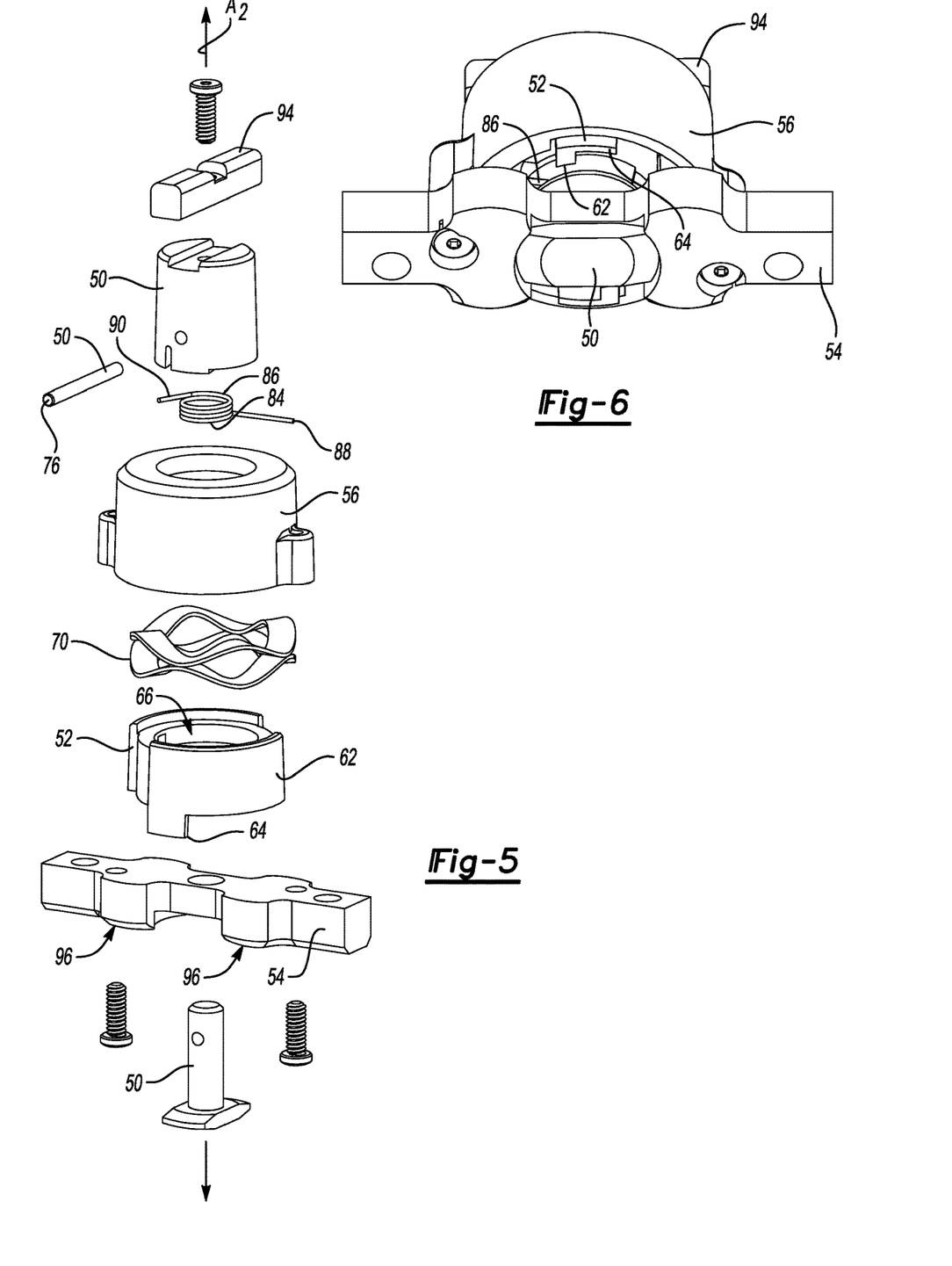
FIG. 5 illustrates an expanded view of the anchoring device of FIG. 1.
FIG. 6 illustrates an bottom view of the anchoring device of FIG. 1.

With reference now to FIGS. 5 and 6 and continuing reference to FIG. 1, the anchoring device 18, according to an exemplary aspect of the present disclosure, includes a latch assembly 50, a lock 52, a latch alignment base 54, and an outer housing 56 disposed along a latch axis $A_L$.

Figure 7:
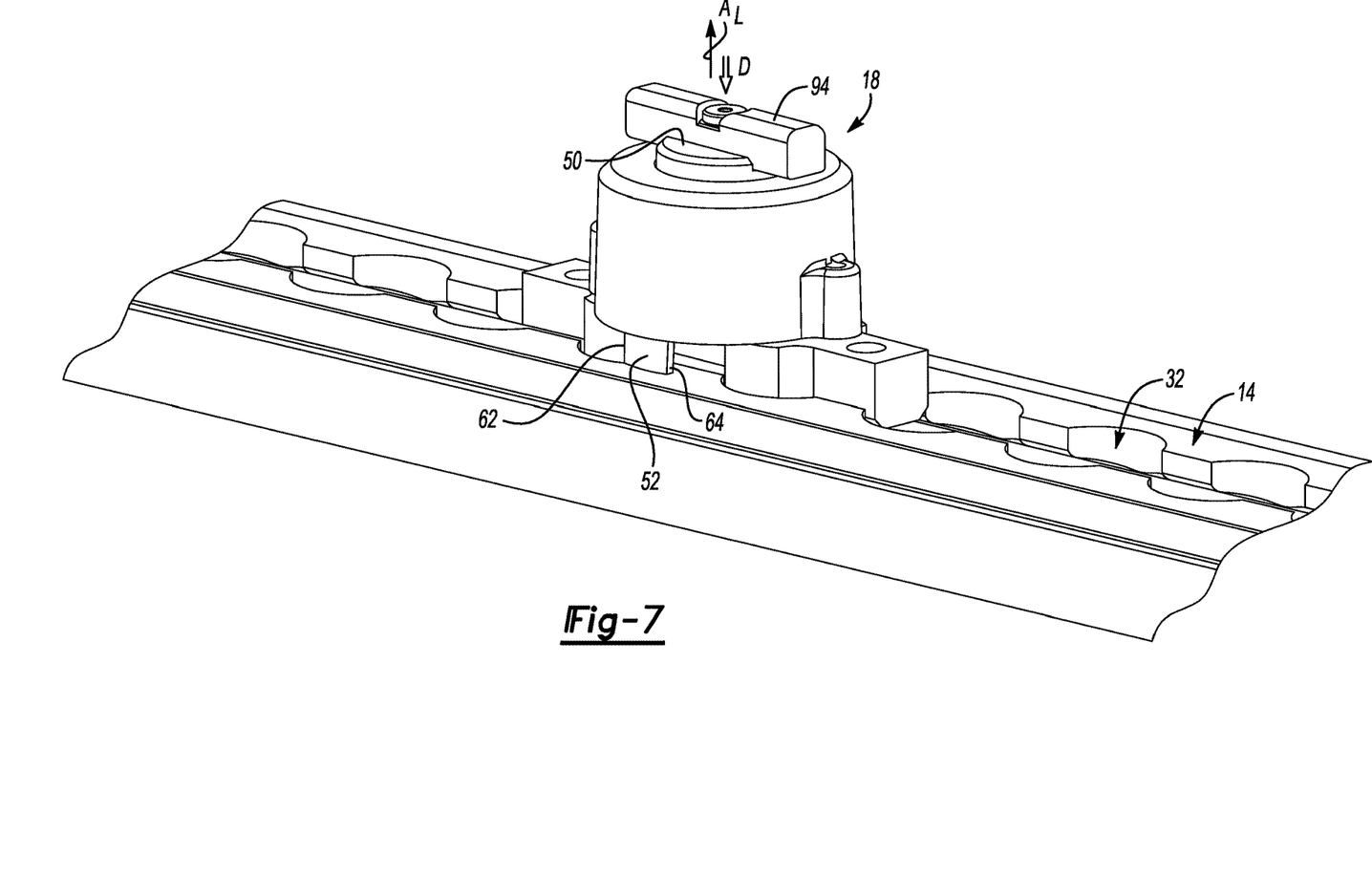
FIG. 7 illustrates a perspective view of the anchoring device of FIG. 1 transitioning to an engaged position with the slotted base.

Generally, to transition the anchoring device 18 from a disengaged position with the slotted base 14 to an engaged position with the slotted base 14, the anchoring device 18 is inserted into the channel 32 in a direction D as shown in FIG. 7.

Figure 8:
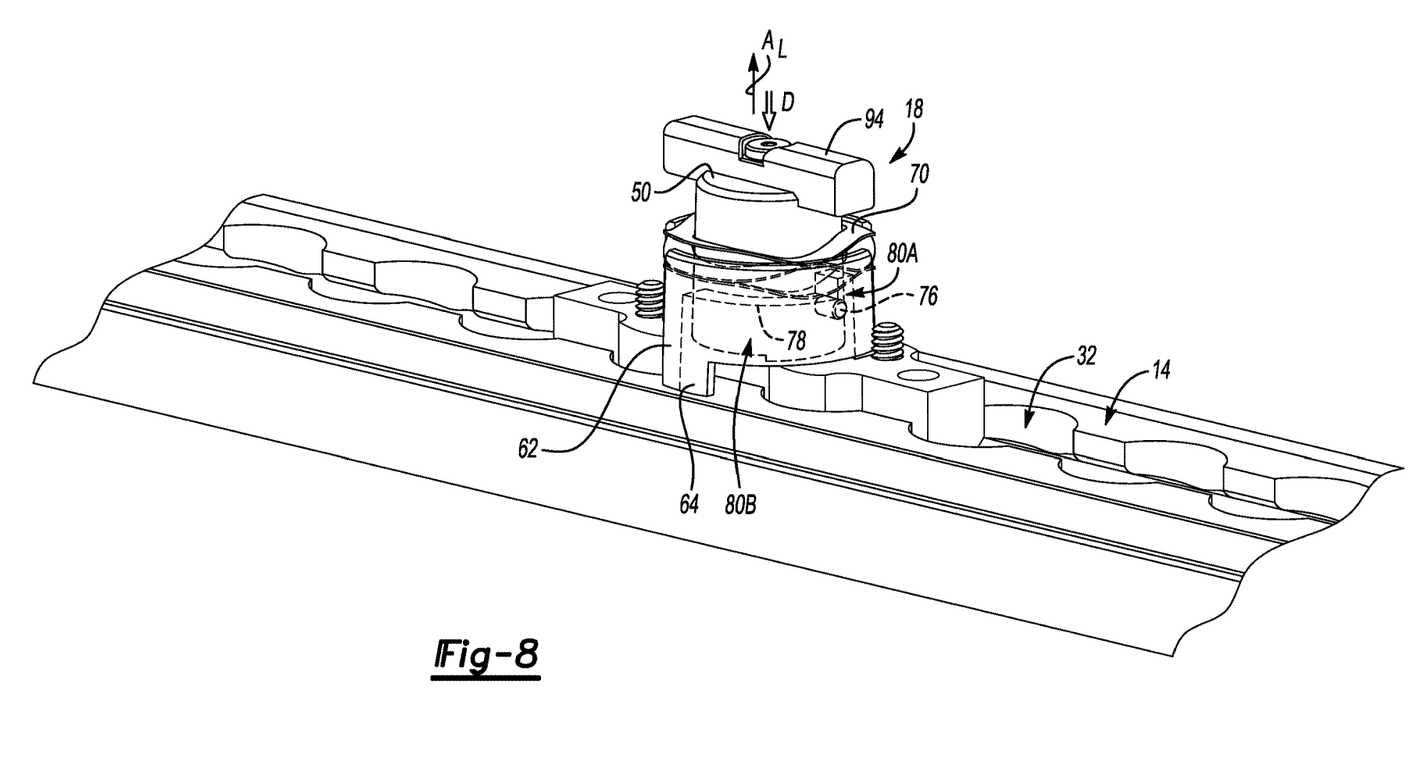
FIG. 8 illustrates the perspective view of the anchoring device of FIG. 7 closer to the engaged position with the slotted base than shown in FIG. 7 and with an outer housing removed.

As shown in FIG. 8, pressing the latch assembly 50 further in direction D shifts the latch assembly 50 to the second axial position while movement of the lock 52 is blocked. The outer housing 56 is not shown in FIG. 8.

The latch assembly 50 and the lock 52 are coaxially arranged about the latch axis $A_L$ in this example. As the latch assembly 50 is moved into the channel 32, at least the latch assembly 50 is configured to shift relative to the lock 52 along the latch axis $A_L$ from a first axial position shown in FIG. 7 to second axial position shown in FIG. 8. After sufficient movement in the direction D, the lock 52 contacts the slotted base 14 and is blocked from shifting with the latch assembly 50 along the latch axis $A_L$.

When the latch assembly 50 is in the first axial position, the latch assembly 50 is prevented from rotating from a disengaged position with the slotted base 14 to an engaged position with the slotted base 14. When the latch assembly 50 is in the second axial position, the latch assembly 50 is rotatable between the engaged position with the slotted base 14 and the disengaged position with the slotted base 14.

Figure 9:
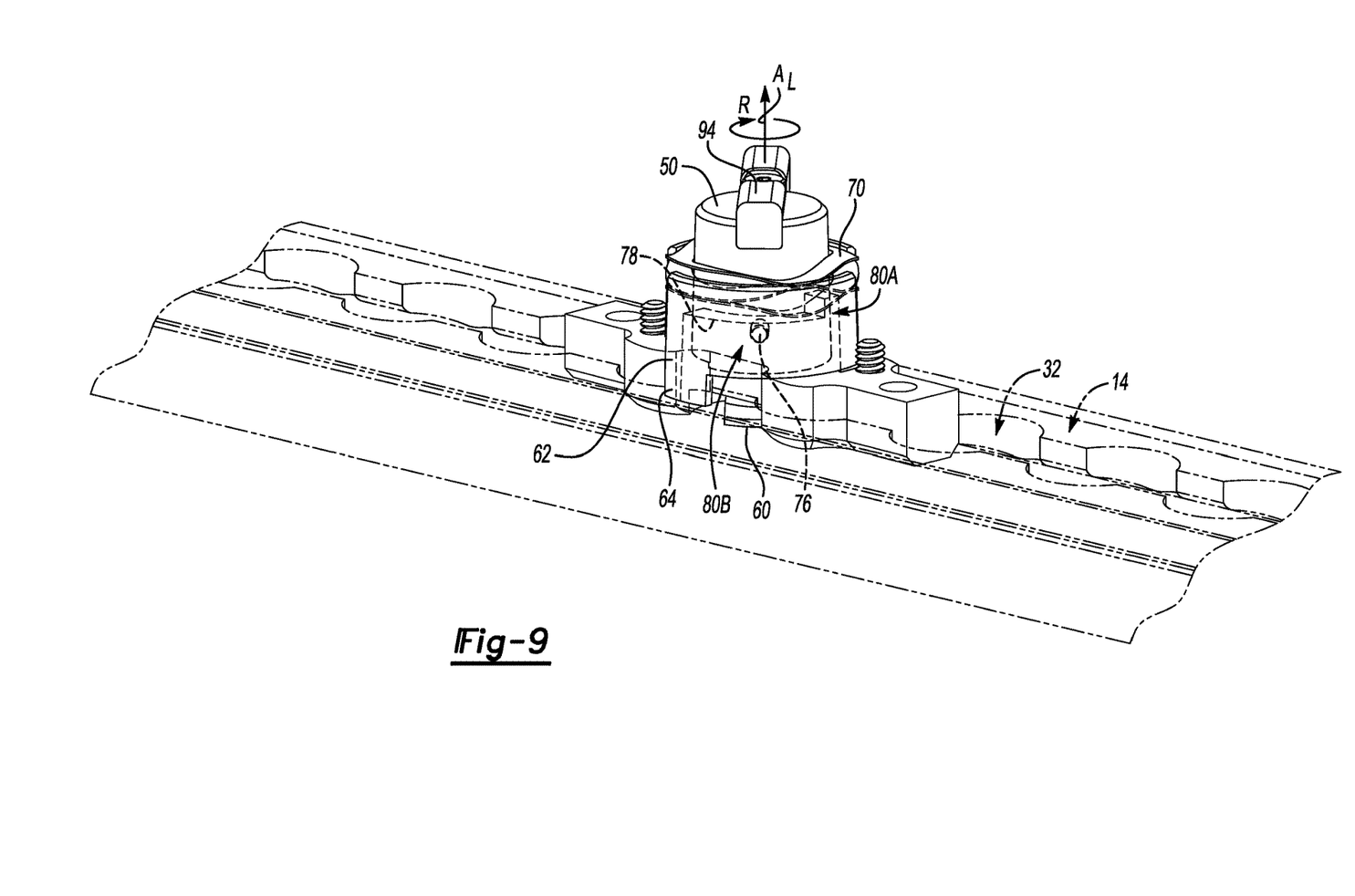
FIG. 9 illustrates the perspective view of the anchoring device of FIG. 8 closer to the engaged position with the slotted base than shown in FIG. 8 and with the slotted track shown in broken lines.
Figures 10, 11:
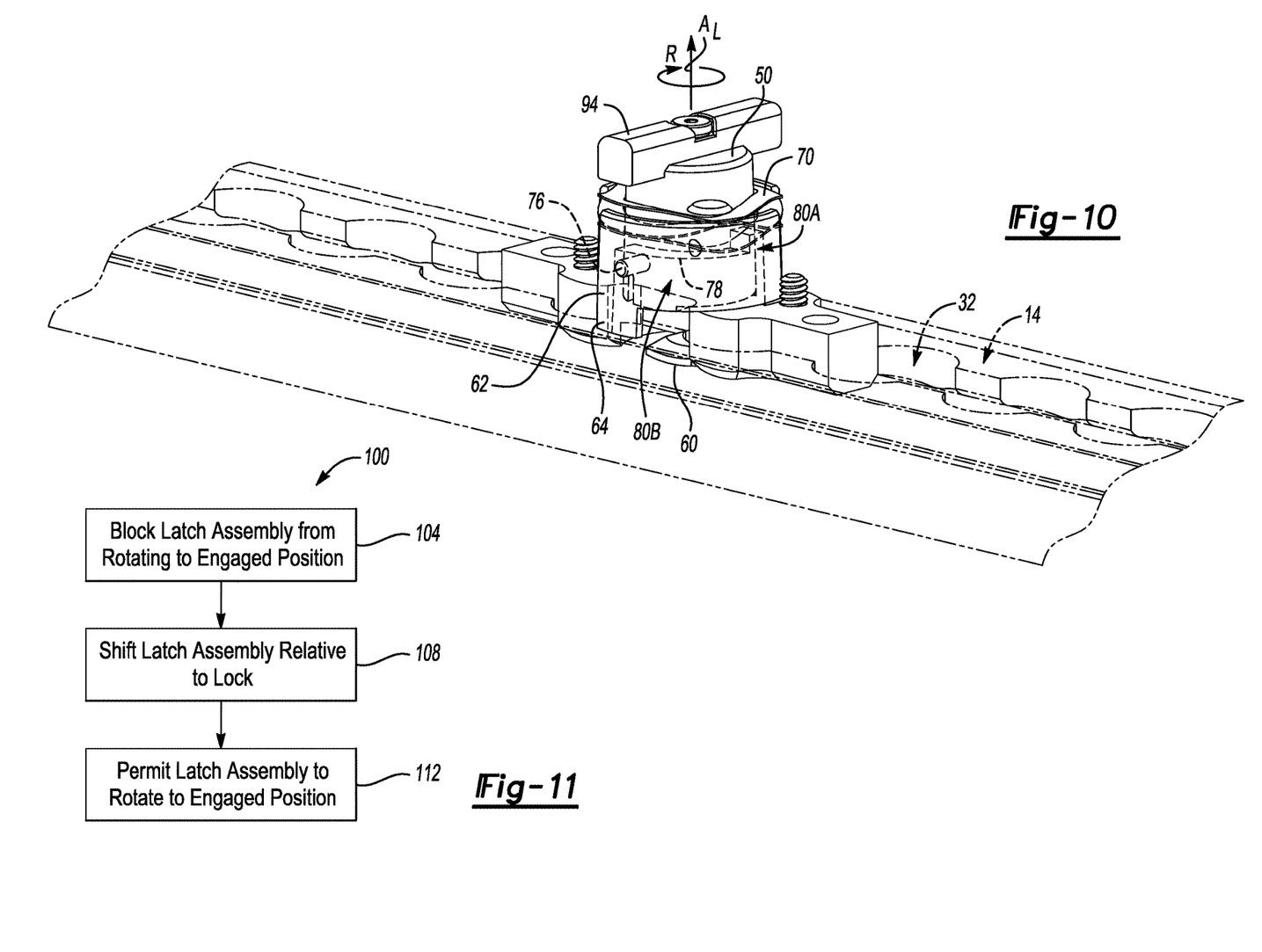
FIG. 10 illustrates the perspective view of the anchoring device of FIG. 9 in the engaged position.
FIG. 11 illustrates a flow of an attachment method utilizing the attachment system of FIGS. 1-10.

With reference to FIG. 9, the latch assembly 50 includes at least one latch foot 60. when the latch assembly 50 is in the second axial position, the latch assembly 50 rotates about the latch axis $A_L$ so that the at least one latch foot 60 rotates within the channel 32 beneath one of the first fingers 38A or beneath one of the second fingers 38B until reaching the engaged position shown in FIG. 10. Contact between the at least one latch foot 60 and the underside of the first fingers 38A or the underside of the second fingers 38B then blocks the latch assembly 50 from being withdrawn from the slotted base 14.

In this example, the lock 52 is a lock collar 62 having at least one finger 64 and a bore 66 that receives the latch assembly 50. The lock collar 62 is at least partially received within outer housing 56, which is cup-shaped in this example. The lock collar 62 extends, further from the outer housing 56 along the latch axis $A_L$ when the latch assembly 50 is in the first position than when the latch assembly 50 is in the second position. In particular, in this example, the at least one finger 64 of the lock collar 62 protrudes further from the outer housing 56 along the latch axis $A_L$ when the latch assembly 50 is in the first axial position than when the latch assembly 50 is in the second axial position.

As the latch assembly 50 is transitioned from the disengaged position to the engaged position, the latch assembly 50, the outer housing 56, the lock collar 62, and the latch alignment base 54 are moved together along the latch axis $A_L$ to move the latch assembly 50 further into the channel 32 until the at least one finger 64 directly contacts the outer surface 34 of the slotted base 14. This direct contact blocks further movement of the lock collar 62 along the latch axis $A_L$.

In this example, a spring 70 is sandwiched along the latch axis $A_L$ between the outer housing 56 and the lock collar 62. The spring 70 biases the lock collar 62 away from the outer housing 56 along the latch axis $A_L$, which moves the at least one finger 64 back to a fully extended position when the at least one finger 64 no longer contacts the slotted base 14.

The example anchoring device 18 includes a rotation control system having a lock pin 76 received within a slot 78. In this example, the latch assembly 50 includes the lock pin 76, and the slot 78 is provided within the lock collar 62. The lock pin 76 extends radially outward from the latch axis $A_L$ into the slot 78.

The slot 78 includes a first area 80A and a second area 80B. The first area 80A and the second area 80B are offset along the latch axis $A_L$. The first area 80A does not extend circumferentially as far as the second area 80B. When the lock pin 76 is received within the first area 80A, and thus axially aligned with the first area 80A, rotation of the latch assembly 50 is limited more than when the lock pin 76 is axially aligned along the latch axis $A_L$ with the second area 80B and received within the second area 80B.

When the latch assembly 50 is in the first axial position, contact between the lock collar 62 and the lock pin 82 within the first area 80A prevents rotation of latch assembly 50 to the engaged position. When the latch assembly 50 is in the second axial position, the lock pin 76 can rotate within the second area 80B so that the latch assembly 50 can rotate to the engaged position.

The latch assembly 50 includes a biasing member 84 that biases the latch assembly 50 to rotate about the latch axis $A_L$ into the engaged position where the at least one latch foot 60 is rotated about the latch axis $A_L$ beneath one of the first fingers 38A or the second fingers 38B.

The biasing member 84 is a torsion spring 86 in this example. One arm 88 of torsion spring 86 is positioned against the lock collar 62. Another arm 90 of the torsion spring 86 is positioned against the latch assembly 50. The torsion spring 86 urges the latch assembly 50 to rotate relative to the lock collar 62. When the lock pin 82 is within the first area 80A of the slot 78, the lock pin 82 contacts the lock collar 62 so that the biasing member 84 is unable to rotate the latch assembly 50 to the engaged position. When the lock pin 82 moves into the second area 80B, the biasing force from the torsion spring 86 automatically rotates the latch assembly 50 to the engaged position.

The latch assembly 50 includes a handle 94. When transitioning the latch assembly 50 to the disengaged position is desired, a user can utilize the handle 94 to turn the latch assembly 50—and the at least one latch foot 60—about the latch axis $A_L$ against the biasing force. The user can then pull the handle 94 to move the lock pin 82 into the first area 80A and then pull the anchoring device 18 away from the slotted base 14.

When transitioning the latch assembly 50 from the disengaged position to the engaged position, the handle 94 can be grasped by the user to position the anchoring device 18 and to press the latch assembly 50 against the slotted base 14 to shift the latch assembly 50 relative to the lock collar 62 along the latch axis $A_L$ from the first axial position to the second axial position.

Again, the anchoring device 18 can fit within the slotted base 14 at a plurality of different positions along the base axis $A_B$ to provide a plurality of options for securing an item. The latch assembly 50 can transition to the engaged position when the anchoring device 18 is at these different positions.

In this example, the latch alignment base 54 has bulged areas 96 that fit within the first arc-shaped cutouts 40A and the second arc-shaped cutouts 40B when the anchoring device is engaged with the slotted base 14. This bulged areas 96 contact the first fingers 38A and second fingers 38B to block the anchoring device 18 from sliding within the channel 32 along the base axis $A_B$. The profile of the latch alignment base 54 is mimicked in the channel 32 in a plurality of different channel areas. The latch alignment base 54 can fit within the channel 32 at any of these different channel areas. The latch assembly 50 is engageable with the slotted base 14 at these different channel areas providing different engagement positions for the latch assembly 50.

With reference to FIG. 11, an example attachment method 100 using the attachment system 10 includes a first step 110 of blocking the latch assembly 50 from rotating from a disengaged position with the slotted base 14 to an engaged position with the slotted base 14 when the latch assembly 50 is in the first axial position.

The attachment method 100 at a step 120 includes shifting the latch assembly 50 relative to the lock 52 along the latch axis $A_L$ from the first axial position to a second axial position while inserting the latch assembly 50 into the slotted base 14. The shifting occurs as the latch assembly 50 is inserted into the slotted base 14.

The attachment method 100, at a step 130, permits the latch assembly 50 to rotate from the disengaged position with the slotted base 14 to the engaged position with the slotted base 14 when the latch assembly 50 is in the second axial position.

The attachment method 100 can includes biasing the latch assembly 50 toward the engaged position in some examples. The attachment method 100 can include actuating the handle 94 of the latch assembly 50 to overcome the biasing and to transition the latch assembly 50 away from the engaged position.

In some exemplary methods, rotation of the latch assembly 50 to the engaged position is accomplished by limiting movement of the lock pin 82 of a rotation control system.

Feature of the disclosed examples can include anchoring device having a latching assembly that can transition to an engaged position with a slotted base by pressing the latching assembly toward the slotted base. The latching device can transition between an engaged and a disengaged position with the base without the use of tools.

In an example, a user pressing the latching device into slots of the slotted base initiates movement to the engaged position. Insertion of the latching device into the openings can be in a direction perpendicular to a face of the base.

The latching device is received within openings in the base to engage the base. The base can be a repeating pattern of holes or slots. The latching device can engage with the base at a plurality of positions. In some examples, as desired, mechanical fasteners could then engage the latching device to more permanently affix the latching device to the base or plate.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An attachment system, comprising:
    a lock of an anchoring device; and
    a latch assembly of the anchoring device, the latch assembly configured to shift relative to the lock along a latch axis from a first axial position to second axial position as the lock is blocked from shifting by a slotted base,
    when the latch assembly is in the first axial position, the latch assembly is blocked from rotating from a disengaged position with the slotted base to an engaged position with the slotted base, wherein the latch assembly is biased toward the engaged position,
    when the latch assembly is in the second axial position, the latch assembly is rotatable between the engaged position with the slotted base and the disengaged position with the slotted base.

2. The attachment system of claim 1, wherein the lock is a lock collar having a bore that receives the latch assembly.

3. The attachment system of claim 2, further comprising an outer housing of the anchoring device, the lock collar at least partially received within the outer housing, the lock collar extending further from the outer housing along the latch axis when the latch assembly is in the first axial position than when the latch assembly is in the second axial position.

4. The attachment system of claim 3, further comprising at least one finger of the lock collar the at least one finger protruding from the outer housing along the latch axis when the latch assembly is in the first axial position, the at least one finger configured to directly contact an outer surface of the slotted base.

5. The attachment system of claim 4, further comprising a spring of the anchoring device, the spring sandwiched along the latch axis between the outer housing and the lock collar, the spring biasing the lock collar away from the outer housing along the latch axis.

6. The attachment system of claim 1, further comprising a rotation control system of the anchoring device, the rotation control system having a lock pin received within a first area of a slot when the lock is in the first axial position, the lock pin received within a second area of the slot when the lock is in the second axial position, the first area axially offset from the second area, the first area permitting rotation of the latch assembly to the engaged position, the second area preventing rotation of the latch assembly to the engaged position.

7. The attachment system of claim 6, wherein the lock is a lock collar having a bore that receives the latch assembly, wherein the latch assembly includes the lock pin that extends radially from the latch axis into the slot within the lock collar.

8. The attachment system of claim 7, wherein the latch assembly further includes a handle configured to be utilized to shift the latch assembly relative to the lock along the latch axis from the first axial position to the second axial position as the lock is blocked from shifting by the slotted base, and further configured to be utilized to rotate the latch assembly from the disengaged position to the engaged position.

9. The attachment system of claim 1, further comprising a latch alignment base of the anchoring device, the latch alignment base received within a channel that is provided by the slotted base when the latch assembly is shifted along the latch axis from the first axial position to the second axial position.

10. The attachment system of claim 9, wherein the latch alignment base has a profile, the slotted base including a plurality of channel areas each having the profile such that the latch assembly is engageable with the slotted base at a plurality of different engagement positions.

11. The attachment system of claim 10, wherein at least some of the plurality of different engagement positions are disposed along a base axis, wherein, when the latch assembly is in the engaged position, the latch alignment base contacts the slotted base to block movement of the latch assembly relative to the slotted base along the base axis, and the latch assembly blocks withdrawal of the anchoring device from the slotted base.

12. The attachment system of claim 11, wherein the latch assembly includes at least one latch foot that contacts an underside of the slotted base to block withdrawal of the latch alignment base from the slotted base when the latch assembly is in the engaged position.

13. An attachment method, comprising:
    as a latch assembly and a latch alignment base of an attachment system are inserted into a channel of a slotted base, shifting the latch assembly and the latch alignment base relative to a lock along a latch axis from a first axial position to a second axial position;
    blocking the latch assembly from rotating from a disengaged position with the slotted base to an engaged position with the slotted base when the latch assembly and the latch alignment base are in the first axial position;

permitting the latch assembly to rotate about the latch axis from the disengaged position with the slotted base to the engaged position with the slotted base when the latch assembly and the latch alignment base are in the second axial position; and rotating at least one latch foot of the latch assembly within a channel of the slotted base when transitioning the latch assembly from the disengaged position to the engaged position.

14. The attachment method of claim 13, further comprising biasing the latch assembly about the latch axis toward the engaged position.

15. The attachment method of claim 14, further comprising actuating a handle of the latch assembly to overcome the biasing and to transition the latch assembly away from the engaged position.

16. The attachment method of claim 13, further comprising preventing rotation of the latch assembly to the engaged position by limiting movement of a lock pin of a rotation control system, the lock pin received within a first area of a slot when the lock is in the first axial position, the lock pin received within a second area of the slot when the lock is in the second axial position, the first area axially offset from the second area, the first area permitting rotation of latch to the engaged position, the second area preventing rotation of the latch to the engaged position.

17. The attachment method of claim 16, further comprising providing the slot within the lock.

18. The attachment method of claim 13, wherein the latch alignment base has a profile, the slotted base including a plurality of channel areas each having the profile such that the latch assembly is engageable with the slotted base at a plurality of different engagement positions.

19. The attachment method of claim 13, further comprising supporting an item relative to the slotted base through the attachment system.

20. The attachment system of claim 1, wherein the latch assembly includes at least one latch foot that rotates about the latch axis within a channel of the slotted base when the latch assembly is transitioning between the first axial position and the second axial position.

21. The attachment method of claim 13, wherein the blocking is a blocking of at least one latch foot of the latch assembly from rotating within the channel.

22. The attachment method of claim 13, wherein the shifting of the latch assembly and the latch alignment base relative to the lock along the latch axis occurs as at least a portion of the latch assembly is inserted into the channel in a direction aligned with the latch axis.

23. An attachment system, comprising:
a lock of an anchoring device;
a latch assembly of the anchoring device, the latch assembly configured to shift relative to the lock along a latch axis from a first axial position to a second axial position as the lock is blocked from shifting by a slotted base; and
at least one foot of the latch assembly that is received within a channel of the slotted base as the latch assembly shifts relative to the lock along the latch axis,
when the latch assembly is in the first axial position the at least one foot of the latch assembly is blocked from rotating within the channel from a disengaged position with the slotted base to an engaged position with the slotted base,
when the latch assembly is in the second axial position, the at least one foot of the latch assembly is rotatable from the disengaged position with the slotted base to the engaged position with the slotted base.

24. An attachment method, comprising:
as a latch assembly and a latch alignment base of an attachment system are inserted into a channel of a slotted base, shifting the latch assembly and the latch alignment base relative to a lock along a latch axis from a first axial position to a second axial position;
blocking the latch assembly from rotating from a disengaged position with the slotted base to an engaged position with the slotted base when the latch assembly and the latch alignment base are in the first axial position, the latch assembly biased about the latch axis to the engaged position with the slotted base; and
permitting the latch assembly to rotate about the latch axis from the disengaged position with the slotted base to the engaged position with the slotted base when the latch assembly and the latch alignment base are in the second axial position.

* * * * *